United States Patent
Boyes et al.

(10) Patent No.: US 7,347,359 B2
(45) Date of Patent: Mar. 25, 2008

(54) SELF-SERVICE TERMINAL

(75) Inventors: James Boyes, Blairgowrie (GB); Donald Macinnes, Fife (GB)

(73) Assignee: NCR Corporation, Dayton, OH (US)

( * ) Notice: Subject to any disclaimer, the term of this patent is extended or adjusted under 35 U.S.C. 154(b) by 209 days.

(21) Appl. No.: 11/130,589

(22) Filed: May 17, 2005

(65) Prior Publication Data
US 2005/0258236 A1 Nov. 24, 2005

(30) Foreign Application Priority Data
May 19, 2004 (GB) ................................. 0411095.3

(51) Int. Cl.
*G07F 19/00* (2006.01)
(52) U.S. Cl. .................... 235/379; 235/475; 705/39
(58) Field of Classification Search .............. 902/8, 902/9; 705/39; 235/439, 446, 475
See application file for complete search history.

(56) References Cited

U.S. PATENT DOCUMENTS

| | | | |
|---|---|---|---|
| 3,570,643 A | 3/1971 | Maierhofer | |
| 3,909,595 A | 9/1975 | Morello et al. | |
| 4,510,381 A | 4/1985 | Fukatsu | |
| 6,454,163 B2 * | 9/2002 | Peebles et al. | 235/379 |
| 2001/0056403 A1 | 12/2001 | Peebles et al. | |
| 2002/0003163 A1 | 1/2002 | Peebles et al. | |
| 2003/0041027 A1 | 2/2003 | Blackson et al. | |
| 2003/0094402 A1 * | 5/2003 | Seo et al. | 209/534 |

FOREIGN PATENT DOCUMENTS

| | | |
|---|---|---|
| EP | 1 315 127 A2 | 5/2003 |
| EP | 1 315 127 A3 | 5/2003 |
| WO | WO 03/032229 A1 | 4/2003 |

\* cited by examiner

*Primary Examiner*—Seung Ho Lee
(74) *Attorney, Agent, or Firm*—Priest & Goldstein PLLC

(57) ABSTRACT

A self-service terminal (10), for example an automated teller machine, comprising a deposit mechanism for receiving deposits from a user. Associated with the deposit mechanism is a sensor for sensing or determining the thickness of media that is to be deposited in the terminal (10). Typically, this sensor is part of a shutter mechanism (24) for selectively opening or closing a deposit slot, this mechanism comprising a shutter (24) that captures and bears against media (34) that is to be deposited. By sensing the thickness of media (34) that is to be deposited, overloading of the deposit mechanism can be avoided.

13 Claims, 3 Drawing Sheets

SELF-SERVICE TERMINAL

BACKGROUND OF THE INVENTION

The present invention relates to a self-service terminal, such as an automated teller machine.

Self-service terminals are commonly used for services, such as banking services, where a number of different types of media may be dispensed from or deposited in the SST by a user. For example, if a bank customer wishes to deposit some money into their account, they may have the option of depositing single bank notes, multiple bank notes simultaneously, a bunch of bank notes in a deposit envelope or a cheque. A problem with existing mechanisms is that overloading of the deposit mechanism by a user can cause internal damage and/or jams to the ATM. This often results in having to close down the ATM and call in service personnel to fix any blockage. Clearly this is undesirable, for the user, the bank and the maintenance company. Hence, there is a need for an improved deposit mechanism.

As well as the deposit mechanism, there is a need for an improved dispensing mechanism. This is because currently, one technique for fraudulently removing money from an automated teller machine is to request that a specific amount of cash be dispensed, but then only remove a portion of the amount actually dispensed, and leave the remaining amount in the dispensing slot, as shown in FIG. 1. Most teller machines are operable to retract cash that is left in the dispensing slot back into the terminal after a pre-determined time has elapsed and then credit the user's account with the initially requested amount. This arrangement is provided because every now and then honest customers genuinely forget to remove their cash from the machine. However, a disadvantage of this is that in the case where a portion of the amount dispensed is removed, and then the remaining cash is retracted, the user's account is credited with the full amount, not the amount that is retracted.

SUMMARY OF THE INVENTION

An object of the present invention is to overcome at least some of the problems associated with the prior art.

According to a first aspect of the invention, there is provided a self-service terminal, preferably an automated teller machine, comprising a deposit mechanism for receiving deposits from a user, the deposit mechanism including a shutter for opening and closing a deposit slot; control means for causing the shutter to move into contact with media inserted into the deposit slot, and means for sensing or determining a thickness of media that is to be deposited therein based on contact between the shutter and the media.

By providing a means for detecting the thickness of a bundle that is being deposited, oversized bundles can be identified. In the event that this happens, remedial action can be taken. For example, a warning message could be presented on a screen associated with the terminal instructing the user to split the bundle. In this way it is possible to prevent oversized bundles from being forced into a terminal.

Preferably, the means for sensing or determining a thickness of a bundle of media is operable to use a force applied by the shutter and/or the position/relative position of the shutter to determine or sense the thickness of the media.

According to another aspect of the invention, there is provided a method for operating a self-service terminal, preferably an automated teller machine, comprising opening a deposit shutter to receive the media; sensing when the media is at least partially inserted; moving the shutter so that it abuts the media; sensing or determining a thickness of media, and in the event that the sensed thickness varies from a pre-determined value or range, taking remedial action.

Preferably, in the case of an attempt to deposit media, the remedial action is presenting a message or warning on a graphical user interface to inform the user that the deposited media is too thick and should be split into smaller bundles.

According to yet another aspect of the invention there is provided a self-service terminal, preferably an automated teller machine, comprising a dispensing mechanism for dispensing media from a terminal and means for sensing or determining a thickness of a bundle of media that is to be dispensed from the terminal.

By providing a means associated with the dispense slot for determining the thickness of a bundle of notes, it is possible to detect when cash is removed from a bundle of notes, which is then subsequently retracted into the terminal. In this way, this type of fraud can be readily detected.

Preferably, the self service terminal comprises a dispense shutter mechanism for selectively opening or closing a slot that is associated with the dispensing mechanism. The shutter mechanism may include a shutter that in use bears against media that is to be dispensed. In this case, the means for sensing or determining a thickness of a bundle of media is operable to use a bearing force applied to the shutter and/or the position of the shutter to determine or sense the thickness of the media.

According to still another aspect of the present invention, there is provided a method for operating a self-service terminal, preferably an automated teller machine, comprising sensing or determining a thickness of media that is to be dispensed and monitoring any changes in that thickness.

According to still further aspect of the invention, there is provided a self service terminal, such as an automated teller machine, comprising a dispensing and/or depositing mechanism, the or each having a shutter that is selectively movable between an open and a closed position, and means for determining or monitoring the position of the shutter or load on the shutter.

By monitoring the position of the shutter, it is possible to detect attempts to access media stored within the terminal via the shutter slot.

Preferably, the means for determining or monitoring the shutter are operable to do so continuously. Alternatively, the means for determining or monitoring the position of the shutter may be operable to do so only when a transaction has been commenced.

According to a yet still further aspect of the invention, there is provided method for operating a self service terminal, such as an automated teller machine, that has a shutter that is operable to selectively open or close a dispense slot or a deposit slot, the method comprising determining or monitoring a physical state of the shutter. Preferably, the physical state is one or both of the position of the shutter or the load on that shutter.

BRIEF DESCRIPTION OF THE DRAWINGS

Various aspects of the invention will now be described by way of example only and with reference to the accompanying drawings, of which.

DETAILED DESCRIPTION

Figure 1:
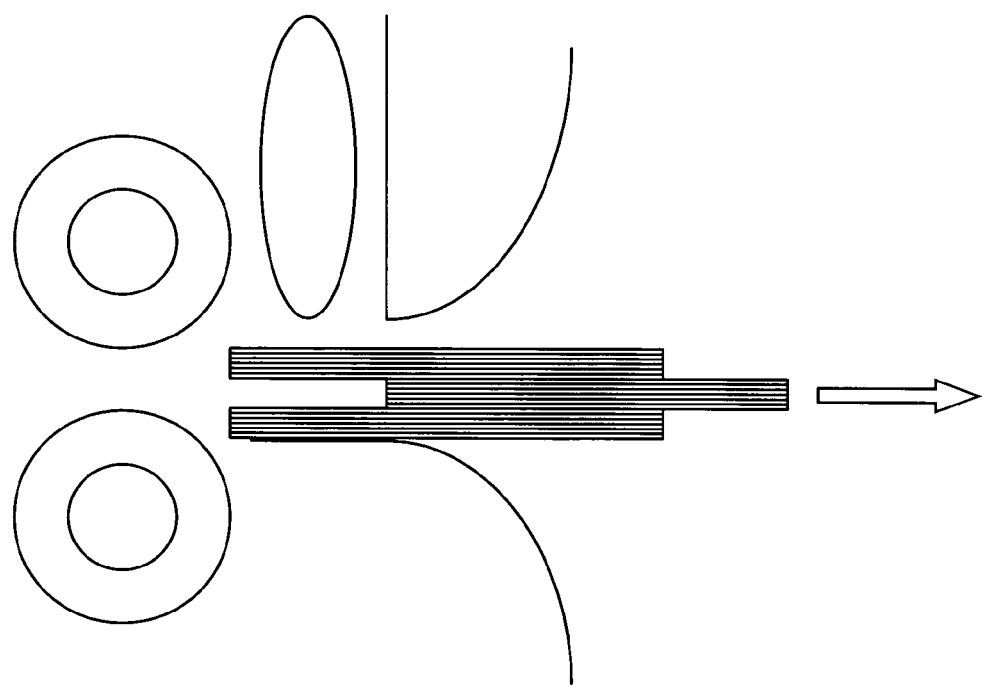
FIG. 1 is a current technique for fraudulently removing money from an automated teller machine.
Figure 2:
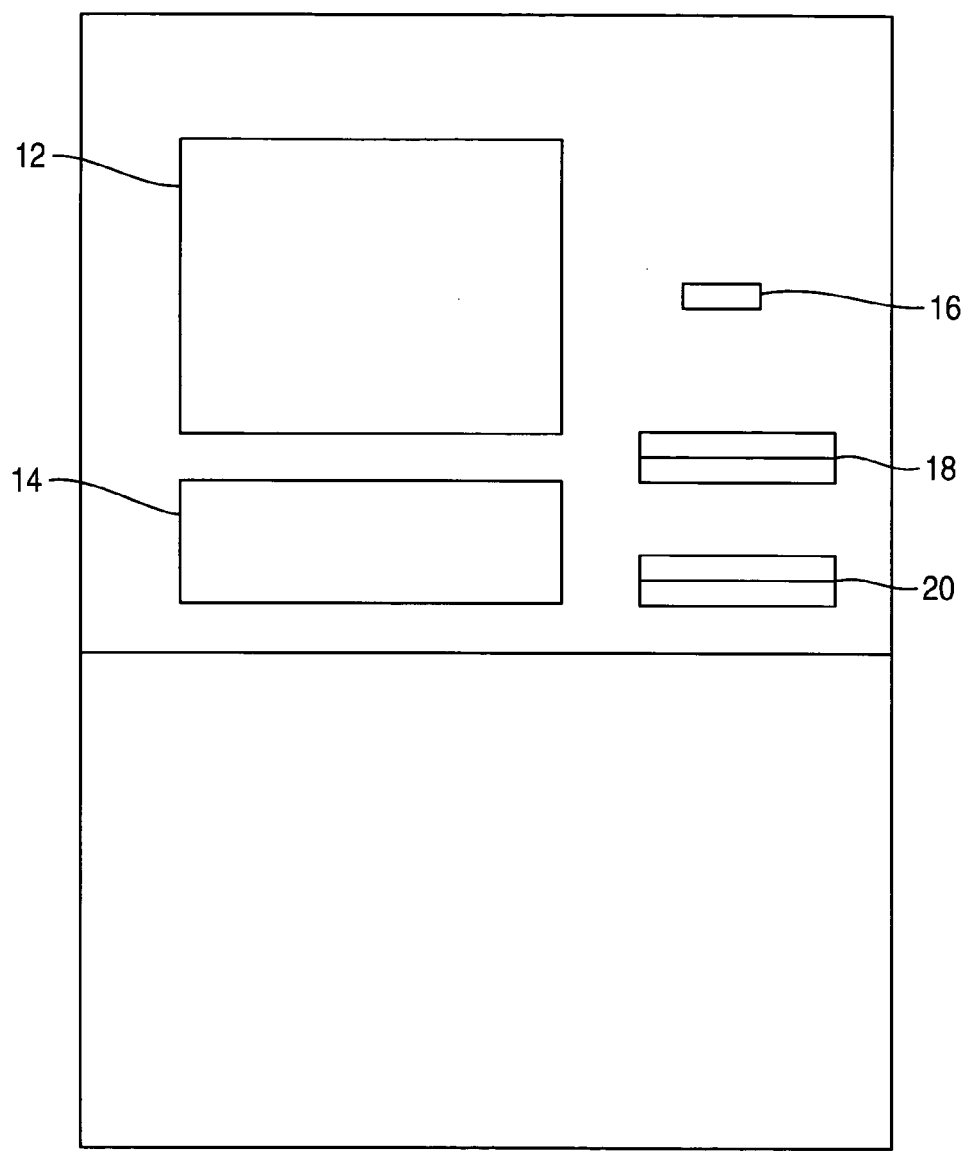
FIG. 2 is a front view of a self-service terminal.

FIG. 2 shows an automated teller machine (ATM) 10 having a graphic user interface 12, a keyboard 14 for receiving user inputs, a card slot 16 for allowing a user's card to be entered into a card reader mechanism (not shown), a dispensing slot 18 from which media can be dispensed and a deposit slot 20 into which media can be deposited. Included in the terminal 10 is control software for controlling internal communications between internal components, transaction flow processes and external communications with, for example, a remote host (not shown). ATMs of this nature are well known and so will not be described in detail.

Figure 3:
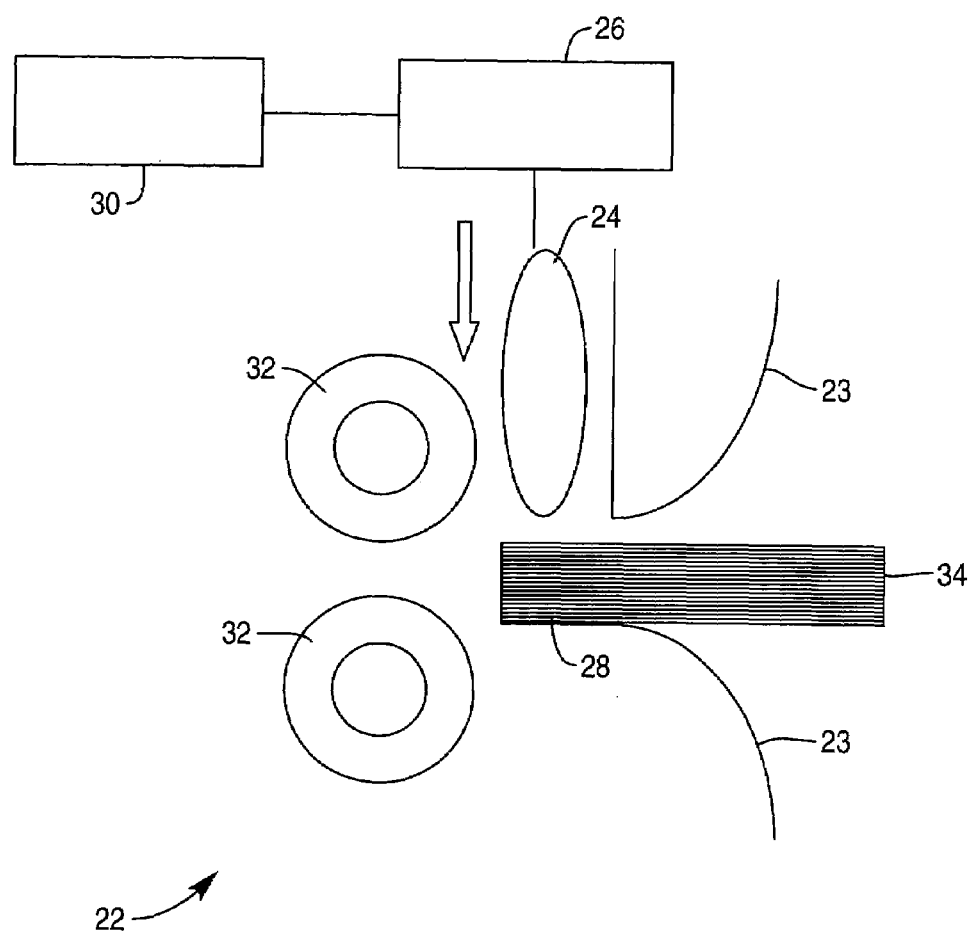
FIG. 3 is a cross-section of a shutter mechanism of FIG. 2.

Associated with each of the dispensing and deposit slot 18 and 20 are dispensing and depositing mechanisms for moving media between the slots 18, 20 and media storage cartridges. Behind the slots are shutter mechanisms 22 for selectively opening and closing the slot. FIG. 3 shows the shutter mechanism 22 in detail. This has a single shutter 24 that is connected to a drive mechanism 26 and faces a generally flat bearing surface 28. Connected to or associated with the shutter 24 are means for determining its relative position and/or the force applied to it. These could be any suitable sensor or detector. For example, where movement of the shutter is caused by rotation of, say, a cam arrangement, the relative position of the shutter can be determined by the amount of rotation of the cam. Another option would be to use an encoder disc that is mounted on the shaft of the motor. In any case, it is possible to determine the amount by which the shutter 24 is moved. The drive mechanism 26 is operable to move the shutter 24 between an open and a closed position in response to instructions received from control software 30. Behind the shutter 24 is a pair of guide rollers 32 for drawing the deposited media 34 into the terminal 10 and passing it onto the next stage of the dispensing mechanism (not shown).

In a rest position, the shutter 24 is maintained closed, bearing against the flat surface 28, until an instruction is received to either allow media to be dispensed from or deposited into the terminal 10. In the case of a deposit, when an appropriate command signal is received, the deposit shutter 24 is raised to open the deposit slot 20. The user then inserts the media 34 that is to be deposited into that slot. The inserted media 34 is initially supported on the flat surface 28. The shutter 24 is then lowered by the drive mechanism 26 until it bears against the flat surface 28, with the inserted media 34 sandwiched therebetween, thereby to create an initial pinch and a partial accept. Movement of the shutter 24 is continued until a pre-determined bearing force is applied. An advantage of this is that used notes can be compressed. By measuring the input force applied to the shutter 24 and/or its actual position, it is possible to establish the thickness of the media. Once this is done, the determined thickness is compared with a maximum such value, which value is stored at a location within the terminal that is accessible by the control software 30.

In the event that the bundle inserted into the deposit shutter 24 is of a suitable size, the deposit process is allowed to continue, and the bundle is drawn into the terminal 10 using the guide rollers 32. In contrast, in the event that the determined thickness is greater than the stored maximum value, a signal is sent to the control software 30, which is operable to cause a suitable alarm or warning message to be presented on the screen 12. For example, the warning message may be "The bundle is too large. Please remove it and split it into smaller bundles, and then insert the smaller bundles individually." In this case, the deposit process is stopped until a smaller sized bundle is inserted.

In addition to preventing oversized bundles of media being forced into the terminal 10, the arrangement of FIG. 3 can assist with the detection of some types of fraud. This can be done by monitoring the thickness of media that is to be dispensed from the terminal 10. As noted earlier, one way to try to fraudulently remove money from an ATM is to remove only part of a bundle of notes, and allow the remaining notes to be retracted. Whilst this type of fraud can be identified and individuals prosecuted, the arrangement in which the invention is embodied provides a mechanism for speeding up the detection process. This is because the shutter arrangement 22, with its means for sensing and detecting the thickness of a bundle, can be configured to monitor changes in the thickness of media that is in the dispensing slot and notify either the terminal control software or the host of any such changes.

To detect potential fraud taking place during a dispensing operation, the thickness of the dispensed media is monitored. In particular, when the media that is to be dispensed is moved into the vicinity of the shutter 24, the shutter 24 is moved into contact with the media thereby to provide a measure of its thickness. In the normal course of events, the media is completely removed, and the measured thickness becomes zero. If a customer genuinely forgets to take their money, then the thickness stays the same and the media is retracted after a pre-determined time. However, in the event that the thickness of the media is changed to a non-zero value, and the media is subsequently retracted, this is indicative of a potential fraud. In this case, a signal indicative of this is sent to the host together with information for identifying the customer concerned. In this way, there is provided a real time indication of the fraudulent activity.

Because the arrangement of FIG. 3 allows the position of and/or the load on the shutter 24 to be determined, it is possible to use this to detect other types of fraud. In particular, it is possible to use this to detect when someone is trying to force open one of the slots 18, 20 to gain access to the media storage areas inside the terminal 10, thereby to illegally remove media therefrom. To detect this type of activity, the means for determining or monitoring the position of the shutter or load on the shutter are operable to continuously monitor the position and/or load on the shutter. Alternatively, the means for determining or monitoring the position of or load on the shutter 24 may be operable to do so only when a transaction has been commenced. In either case, in the event that the position is unusual or the load is more than expected, a signal can be sent to the host indicating that a potential attack is occurring. The host can then take appropriate action, such as alerting the police. Alternatively or additionally, an alarm signal may be sent to the control software, which may then take remedial action. For example an audible alarm at the ATM may be activated, or where the ATM has a camera associated with it, this may be caused to take a picture of the person who is trying to extract media from it.

A skilled person will appreciate that variations of the disclosed arrangements are possible without departing from the invention. For example, whilst in the embodiment described above, separate dispensing and depositing slots are provided, it will be appreciated that a single slot could be provided for use both as a dispensing and depositing slot. Accordingly the above description of a specific embodiment is made by way of example only and not for the purposes of limitation. It will be clear to the skilled person that minor modifications may be made without significant changes to the operation described.

The invention claimed is:

1. A self-service terminal comprising:
   a deposit mechanism for receiving deposits from a user, the deposit mechanism including a shutter for opening and closing a deposit slot so as to selectively control admission of media into the deposit slot;
   control means for causing the shutter to move into contact with media inserted into the deposit slot after the shutter has opened and media has been inserted into the deposit slot; and means for sensing or determining a thickness of a bundle of media to be deposited based on contact between the shutter and the media.

2. A self service terminal as claimed in claim 1, wherein the means for sensing or determining a thickness of a bundle of media is operable to use a force applied by the shutter to determine or sense the thickness of the media.

3. A self service terminal as claimed in claim 1, wherein the means for sensing or determining a thickness of a bundle of media is operable to use position of the shutter to determine or sense the thickness of the media.

4. A self service terminal as claimed in claim 1, wherein the means for sensing or determining a thickness of a bundle of media is operable to use a force applied by the shutter and position of the shutter to determine or sense the thickness of the media.

5. A method of operating a self-service terminal, the method comprising the steps of:
   upon a command to allow insertion of media, opening a deposit shutter from a previously closed position to admit insertion of media into a deposit slot;
   after the shutter has opened and media has been inserted into the deposit slot, moving the shutter so that the shutter abuts the media;
   sensing or determining a thickness of the media; and
   talking remedial action if the sensed thickness varies from a pre-determined value or range.

6. A method as claimed in claim 5, wherein the step of taking remedial action includes the step of presenting a message or warning on a graphical user interface to inform the user that the media is too thick and should be split into smaller bundles when an attempt is made to deposit the media.

7. A method as claimed in claim 5, wherein the self-service terminal comprises an automated teller machine.

8. A self-service terminal comprising:
   a dispensing mechanism for dispensing media;
   means for sensing or determining changes in a thickness of a bundle of media to be dispensed; and
   means for noting if the thickness of the bundle of media changes and the change in thickness is to a non-zero value.

9. A self service terminal as claimed in claim 8, further comprising a dispense shutter mechanism for selectively opening or closing a slot associated with the dispensing mechanism.

10. A self service terminal as claimed in claim 8, wherein the shutter mechanism includes a shutter which is operable to bear against media to be dispensed prior to release of that media.

11. A self service terminal as claimed in claim 10, wherein the means for sensing or determining a thickness of a bundle of media is operable to use a bearing force applied to the shutter to determine or sense the thickness of the media.

12. A self service terminal as claimed in claim 10, wherein the means for sensing or determining a thickness of a bundle of media is operable to use the position of the shutter to determine or sense the thickness of the media.

13. A self service terminal as claimed in claim 10, wherein the means for sensing or determining a thickness of a bundle of media is operable to use a bearing force applied to the shutter and the position of the shutter to determine or sense the thickness of the media.

* * * * *